US008948548B2

(12) United States Patent
Assefa et al.

(10) Patent No.: US 8,948,548 B2
(45) Date of Patent: Feb. 3, 2015

(54) POLARIZATION DIVERSE DEMULTIPLEXING

(75) Inventors: Solomon Assefa, Ossining, NY (US); Douglas M. Gill, South Orange, NJ (US); William M. Green, Astoria, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/611,229

(22) Filed: Sep. 12, 2012

(65) Prior Publication Data

US 2014/0064656 A1    Mar. 6, 2014

Related U.S. Application Data

(63) Continuation of application No. 13/603,811, filed on Sep. 5, 2012.

(51) Int. Cl.
*G02B 6/12* (2006.01)

(52) U.S. Cl.
USPC ............................... 385/11; 385/24; 359/239

(58) Field of Classification Search
USPC ..................................... 385/11, 24; 359/239
See application file for complete search history.

(56) References Cited

U.S. PATENT DOCUMENTS

| 4,697,876 | A | * | 10/1987 | Dyott | 385/12 |
|---|---|---|---|---|---|
| 4,823,220 | A | * | 4/1989 | Milster et al. | 369/13.3 |
| 5,377,035 | A | * | 12/1994 | Wang et al. | 398/152 |
| 5,448,351 | A | | 9/1995 | Florek et al. | |
| 5,793,743 | A | * | 8/1998 | Duerig et al. | 369/126 |
| 5,809,184 | A | | 9/1998 | Doerr et al. | |
| 5,946,128 | A | * | 8/1999 | Paek | 359/305 |
| 6,188,768 | B1 | * | 2/2001 | Bethune et al. | 380/278 |
| 6,256,103 | B1 | * | 7/2001 | Sorin et al. | 356/484 |
| 6,278,813 | B1 | | 8/2001 | Takada et al. | |
| 6,330,097 | B1 | | 12/2001 | Chen et al. | |
| 6,411,409 | B1 | * | 6/2002 | Ducellier | 398/43 |
| 8,014,686 | B2 | | 9/2011 | Rahn et al. | |
| 8,260,136 | B2 | | 9/2012 | Nagarajan et al. | |
| 8,538,277 | B2 | | 9/2013 | Nagarajan et al. | |
| 8,548,333 | B2 | | 10/2013 | Nagarajan et al. | |
| 2003/0081873 | A1 | * | 5/2003 | Tan et al. | 385/11 |

(Continued)

FOREIGN PATENT DOCUMENTS

JP        S6057824 A        4/1985

OTHER PUBLICATIONS

T. Liang, H. Tsang, C. Wong, and C. Shu, "All-optical time-division demultiplexing with polarization-diversity nonlinear loop interferometer," Opt. Express 11, 2047-2052 (2003).*

(Continued)

*Primary Examiner* — Peter Radkowski
(74) *Attorney, Agent, or Firm* — Cantor Colburn LLP; Vazken Alexanian

(57) ABSTRACT

A method for demultiplexing an optical signal includes receiving a multi polarization optical signal, separating the multi polarization optical signal into a first polarization optical signal and a second polarization optical signal, rotating a polarization of the first polarization optical signal to match a polarization of the second polarization optical signal, routing the first polarization optical signal and the second polarization optical signal to a common demultiplexing device, outputting a channel of the first polarization optical signal and the second polarization optical signal to a common photodetector.

20 Claims, 5 Drawing Sheets

(56) References Cited

U.S. PATENT DOCUMENTS

| | | |
|---|---|---|
| 2005/0147344 A1* | 7/2005 | Assefa et al. ............... 385/22 |
| 2006/0147210 A1 | 7/2006 | Kim et al. |
| 2006/0215960 A1* | 9/2006 | Tabuchi ....................... 385/37 |
| 2008/0267638 A1 | 10/2008 | Nakashima et al. |
| 2009/0169220 A1* | 7/2009 | Kahn et al. .................. 398/200 |
| 2009/0238579 A1 | 9/2009 | Rahn et al. |
| 2009/0245801 A1 | 10/2009 | Little et al. |
| 2010/0014873 A1 | 1/2010 | Bulow |
| 2010/0322628 A1 | 12/2010 | Nagarajan et al. |
| 2010/0322629 A1 | 12/2010 | Nagarajan et al. |
| 2010/0322631 A1 | 12/2010 | Nagarajan et al. |
| 2011/0038631 A1 | 2/2011 | Doerr |
| 2011/0148522 A1 | 6/2011 | Tsai et al. |
| 2012/0002971 A1 | 1/2012 | Doerr |
| 2013/0188971 A1* | 7/2013 | Painchaud ................... 398/214 |
| 2013/0208334 A1* | 8/2013 | Kakande et al. ............. 359/246 |
| 2013/0279910 A1 | 10/2013 | Ziari et al. |
| 2014/0003815 A1 | 1/2014 | Mertz et al. |
| 2014/0064729 A1 | 3/2014 | Assefa et al. |

OTHER PUBLICATIONS

W. Bogaerts, D. Taillaert, P. Dumon, D. Van Thourhout, R. Baets, and E. Pluk, "A polarization-diversity wavelength duplexer circuit in silicon-on-insulator photonic wires," Opt. Express 15, 1567-1578 (2007).*

H. Fukuda, K. Yamada, T. Tsuchizawa, T. Watanabe, H. Shinojima, and S. Itabashi, "Silicon photonic circuit with polarization diversity," Opt. Express 16, 4872-4880 (2008).*

L. Liu, Y. Ding, K. Yvind, and J. Hvam, "Silicon-on-insulator polarization splitting and rotating device for polarization diversity circuits," Opt. Express 19, 12646-12651 (2011).*

Bogaerts et al., "A polarization-diversity wavelength duplexer circuit in silicon-on-insulator photonic wires," Optics Express, vol. 15, No. 4, 2007, pp. 1567-1578.

Doerr, C.R., et al., "Monolithic InP Multiwavelength Coherent Receiver Using a Chirped Arrayed Waveguide Grating," Journal of Lightwave Technology, vol. 29, No. 4, Feb. 15, 2011, pp. 536-541.

Doerr, C.R., et al., "Monolithic Polarization and Phase Diversity Coherent Receiver in Silicon," Journal of Lightwave Technology, vol. 28, No. 4, Feb. 15, 2010, pp. 520-525.

Watts, et al., "Integrated mode-evolution-based polarization rotators" Optics Letters, vol. 30, No. 2, Jan. 15, 2005, pp. 138-140.

Zhang, Z., et al., "Polymer-based photonic toolbox: passive components, hybrid integration and polarisation control," IET Optoelectronics, vol. 5, No. 5, Oct. 2011, pp. 226-232.

* cited by examiner

POLARIZATION DIVERSE DEMULTIPLEXING

CROSS-REFERENCE TO RELATED APPLICATIONS

This is a continuation application of and claims priority from U.S. application Ser. No. 13/603,811, filed on Sep. 5, 2012; the entire contents of which are incorporated herein by reference.

FIELD OF INVENTION

The present invention relates generally to electro-optical systems, and more specifically, to electro-optical de-multiplexing systems.

DESCRIPTION OF RELATED ART

Optical fiber is often used for data communications systems. Optical signals are often de-multiplexed using a demultiplexing (DEMUX) device such as an arrayed waveguide grating (AWG) DEMUX or echelette grating DEMUX that focuses and separates the channels of the optical signals. For example, an AWG DEMUX includes a plurality of waveguides having different lengths that focuses each individual channel (i.e., each frequency in the optical signal) on a surface of a corresponding photodetector. The photodetector converts the optical channel into an electrical signal that may be sent to a processor.

BRIEF SUMMARY

In accordance with one embodiment of the present invention, a method for demultiplexing an optical signal includes receiving a multi polarization optical signal, separating the multi polarization optical signal into a first polarization optical signal and a second polarization optical signal, rotating a polarization of the first polarization optical signal to match a polarization of the second polarization optical signal, routing the first polarization optical signal and the second polarization optical signal to a common demultiplexing device, outputting a channel of the first polarization optical signal and the second polarization optical signal to a common photodetector.

In accordance with another embodiment of the present invention, a method for demultiplexing an optical signal includes receiving a multi polarization optical signal, separating the multi polarization optical signal into a first polarization optical signal and a second polarization optical signal with a polarization splitter, rotating a polarization of the first polarization optical signal to match a polarization of the second polarization optical signal with a polarization rotator, routing the first polarization optical signal and the second polarization optical signal to a common demultiplexing device, outputting a channel of the first polarization optical signal and the second polarization optical signal to a common photodetector.

In accordance with yet another embodiment of the present invention, a method for demultiplexing an optical signal includes receiving a multi polarization optical signal, separating the multi polarization optical signal into a first polarization optical signal and a second polarization optical signal and rotating a polarization of the first polarization optical signal to match a polarization of the second polarization optical signal with a polarization splitting grating, routing the first polarization optical signal and the second polarization optical signal to a common demultiplexing device, outputting a channel of the first polarization optical signal and the second polarization optical signal to a common photodetector.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Silicon photonic systems often include polarization dependent dispersion and loss due to high index contrast between the waveguide core and cladding within the optical waveguide circuitry. In previous systems, when two polarizations (e.g., transverse electric (TE) and a transverse magnetic (TM)) are received from a transmission link, a first polarization is accepted as is into the optical waveguide circuit, and the second polarization is introduced into the waveguide circuitry either by coupling or rotating the second polarization into the first polarization. Previous systems included two similar receive component links (e.g., two photodetectors, two transimpedance amplifiers, and associated electronics) to process the different polarizations of the optical signals. Such an arrangement may degrade the signal to noise ratio of the system since two photodetectors are used for the same channel resulting in two separate sources of noise. Such systems also provide undesirable power consumption, consume larger amounts of space, and offer multiple points of failure.

The exemplary embodiments and methods described below provide for the use of a single AWG DEMUX device and a single electro-optical processing sub-system that converts the received optical signal channels into electrical signals.

Figure 1:
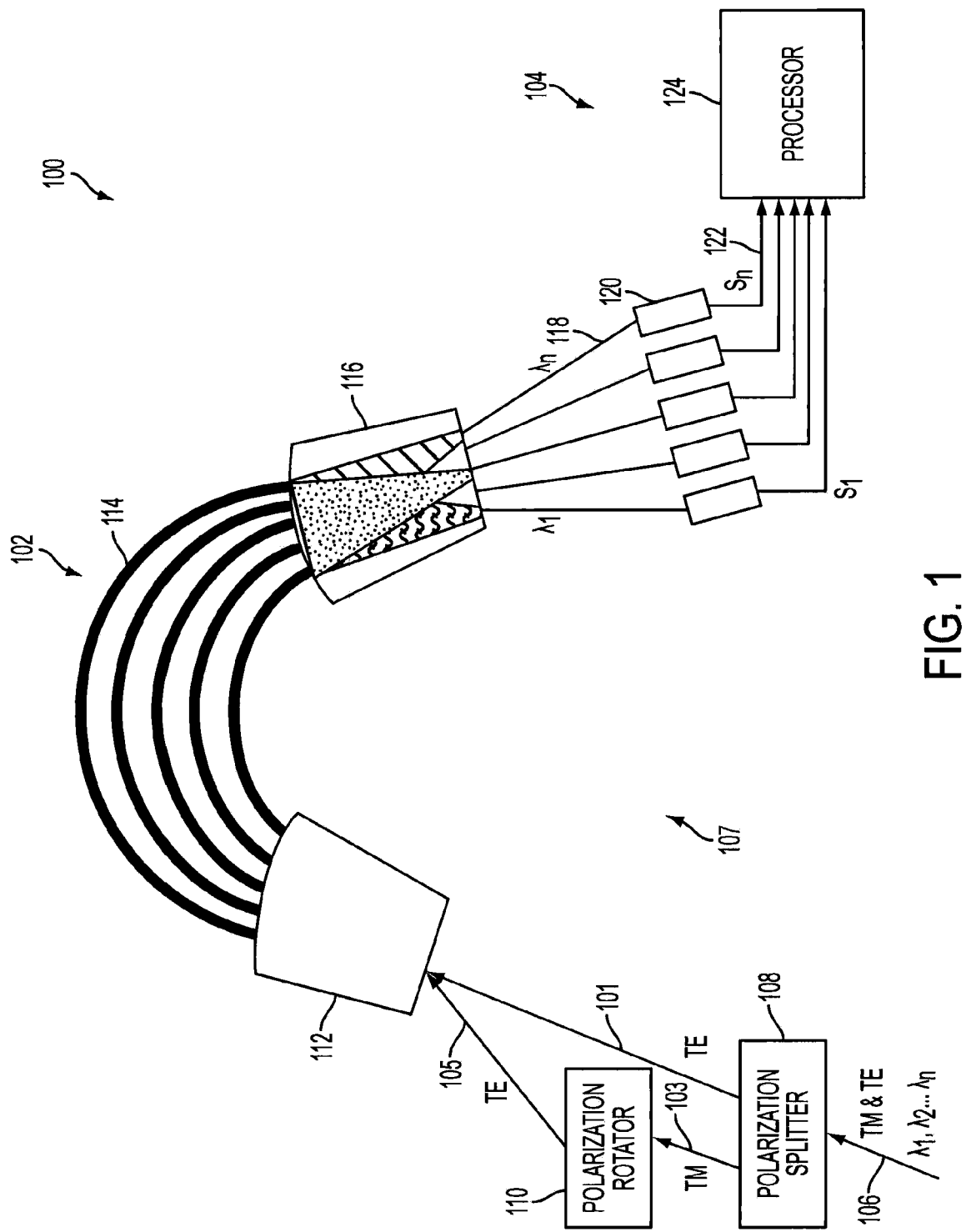
FIG. 1 illustrates an exemplary embodiment of a DEMUX system.

FIG. 1 illustrates an exemplary embodiment of a DEMUX system 100. In this regard, the system 100 includes a AWG unit 102 that is communicatively connected to a processor unit 104 and an optical fiber 106 that carries an optical signal having a plurality of channels each having a different wavelength ($\lambda_1, \lambda_2 \ldots \lambda_n$).

The optical signal typically includes a TE and TM polarization. The optical fiber 106 is connected to a polarization splitter portion 108 that splits or separates the TE and TM polarizations into separate signals that are propagated on separate paths 101 and 103. The exemplary embodiments may include one or more polarization splitting devices. For example, one type of polarization splitting device first couples both polarizations from the fiber into an optical waveguide structure and includes an asymmetric Mach-Zehnder interferometer (MZI) that has waveguide birefringence designed into at least part of the device. The waveguide birefringence causes the TE and TM polarizations to propagate at different speeds within the device. The asymmetry can be achieved via making one of the two MZI arms having a longer optical path length than the other. The optical path length of an optical waveguide can be made longer either by actually increasing its length and maintaining its core cross section, or by maintaining the same physical path length but modifying the waveguide cross section such that the effective optical index of the waveguide is modified, thereby changing the optical path length. A combination of these two approaches can be used. The birefringent asymmetry results in the TE polarization exiting one output of the two-by-two Mach-Zehnder and the TM polarization exiting the other output. After the two polarizations are separated, one of the two polarizations traverses a waveguide component that rotates that polarization such that both signals then have the same polarization, for example the TM polarization output would be rotated to be TE. In this way two separate TE polarization signals are created within the circuit. A second alternative exemplary embodiment includes a two dimensional perpendicular optical grating coupler that has one of its grating dimensions couple the fiber TE polarization into a TE polarization in the optical waveguide structure and the other grating dimension couple the fiber TM polarization into a TE polarization in the optical waveguide structure, but in a different direction. In this case, the additional waveguide structure to rotate the TM polarization into a TE polarization is not included. A third alternative exemplary embodiment first couples both polarizations from the fiber into an optical waveguide structure that has an adiabatically tapered asymmetric waveguide splitter separate the two polarizations, and then an additional waveguide structure rotates the TM polarization into a TE polarization. The separate paths may be defined by, for example, optical waveguides or optical fibers. The signal in the path 103 (e.g., the TM signal) is received by a polarization rotator portion 110 that rotates the polarization of the signal to substantially the same polarization as the signal on the path 101 and outputs the rotated signal via the path 105. The polarization rotator is created by first creating a birefringent optical waveguide in the optical path. A birefringent waveguide may be created in a number of exemplary ways, one of which is to have a 'long' and 'short' dimension to the waveguide core cross section, for example the waveguide could be twice as 'tall' as it is 'wide'. A polarization rotator can then be made by gradually modifying the waveguide cross section such that the waveguide cross section dimensions are switched, and the waveguide adiabatically becomes twice as 'wide' as it is 'tall'. This can be achieved by having two waveguide core levels, one above the other, and having the first core level start as being 'wider' than tall, and gradually tapering to a lesser width so that the first core waveguide becomes nearly square. The second core level maintains a square profile and gradually comes in from the side of the first core waveguide as the first core waveguide is tapering to a lesser width. The second core level then becomes coincident with the first after it tapers to a lesser width such that the first and second core levels have the same width and the resulting waveguide core is made up of the first and second core levels and is about twice as 'tall' as it is 'wide'.

The signals are received by a first free space portion 112 of the AWG unit 102. The input waveguides terminate at the focal point of the input free space region. In addition, the two input waveguides carrying the TE polarization are brought into proximity with each other at their termination at the focal point of the input free space region. The result is that the TE polarized optical fields in the two waveguides, which are typically single mode (or very nearly single mode) waveguides, interact such that the sum of optical fields at the point where the two waveguides terminate create a profile that is similar to a multi-mode waveguide. This can be achieved by arranging the two waveguides in proximity, or by creating a small region in which the two waveguides are joined together, creating a multi-mode coupling section, prior to entering the input free space region.

Though in the illustrated exemplary embodiment, the TM polarization is rotated by the polarization rotator portion 110, in an alternate embodiment, another polarization such as, the TE polarization may be rotated by the polarization rotator portion 110 if desired. The system 100 may be arranged on a common substrate 107 if desired. In this regard, the AWG unit 102 may be arranged on, for example a silicon substrate with the polarization splitter portion 108 and the polarization rotator portion 110. The processor portion 104 may also be arranged on the common substrate 107 in some embodiments.

The optical signals enter a first free space portion 112 of the AWG unit 102 and the signal light diverges in the free space region such that a portion of light from each channel couples into each of the optical waveguides 114 in the arrayed grating section of the AWG. The signals enter waveguides 114 each having a different length. The light passes through the waveguides 114 such that a portion of light from each channel enters a second free space portion 116 from each of the waveguides 114. The length of each waveguide 114 affects a particular phase shift on the portion of light that traveled through the waveguide due to the difference in wavelength of each of the channels. Light is diffracted from each waveguide 114 and through constructive interference, is refocused and directed to a particular output position where it is imaged to a multi-mode profile. The output waveguides 118 direct each of the channels to a corresponding photodetector device 120. The photodetector devices 120 are multi-mode receivers that support the imaged quasi-first order mode. Each of the photodetector devices 120 may be, for example, approximately 300 nanometers (nm) to 1000 nm wide depending on the optical wavelength used and the cross sectional geometry of the photodetector devices.

The photodetector devices are communicatively connected to the processor unit 104 that converts the optical channel signal into an electrical signal 122 ($S_1, S_2 \ldots S_n$) that is received by a processor 124.

Figure 2:
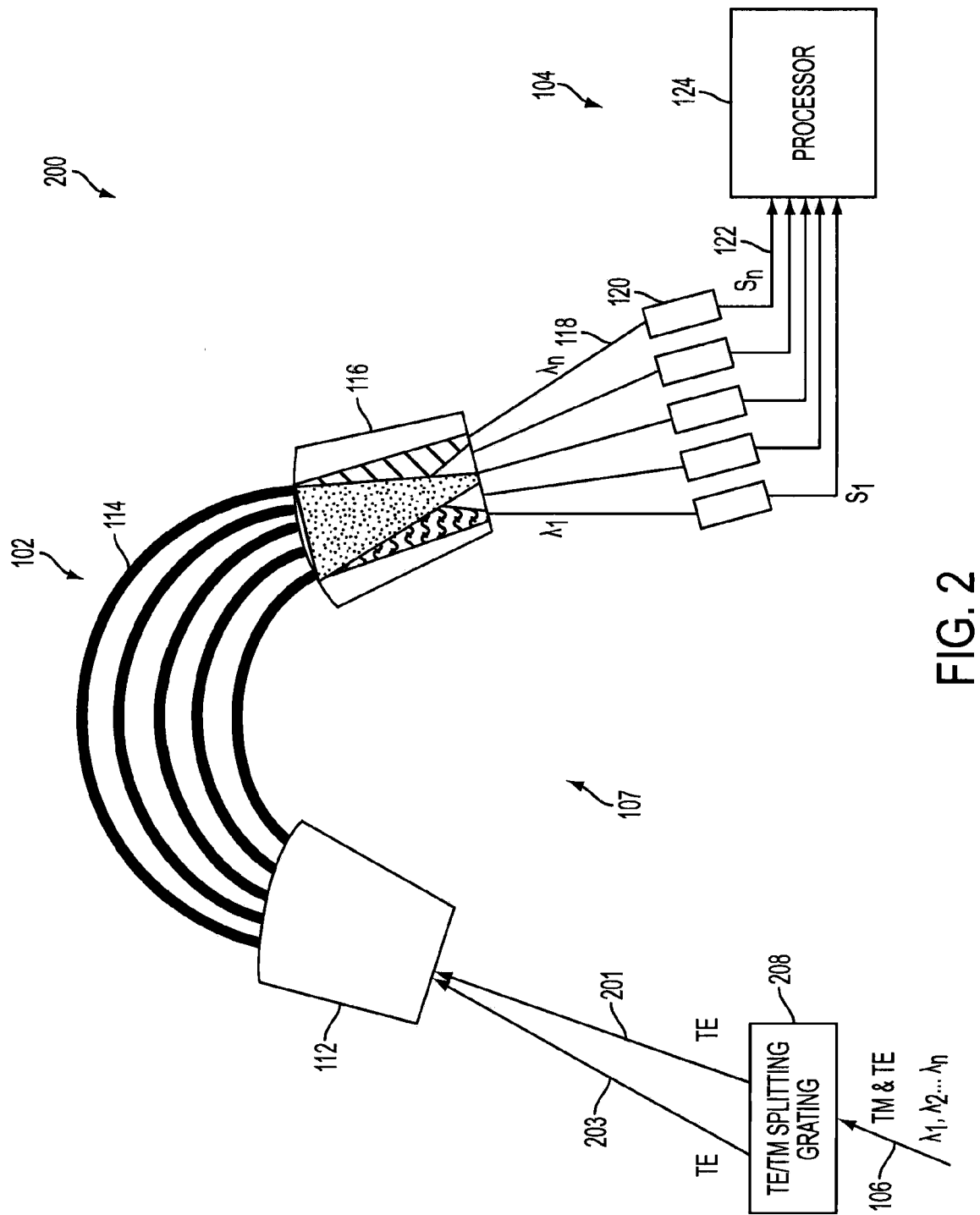
FIG. 2 illustrates an alternate exemplary embodiment of a DEMUX system.

FIG. 2 illustrates an alternate exemplary embodiment of a DEMUX system 200. In this regard, the system 200 includes a AWG unit 102 that is communicatively connected to a processor unit 104 and an optical fiber 106 that carries an optical signal having a plurality of channels each having a different wavelength ($\lambda_1, \lambda_2 \ldots \lambda_n$) The optical signal includes TE and TM polarizations.

The optical fiber 106 is connected to a polarization splitting grating portion 208 that splits or separates the TE and TM polarizations into separate signals such that both the TE and TM polarizations propagate as TE in the waveguide circuit. The signals are propagated on separate paths 201 and 203. The paths 201 and 203 are input to the first free space portion 112 of the AWG unit 102 and are brought together to form a quasi-first order mode in a similar manner as described above.

Figure 3:
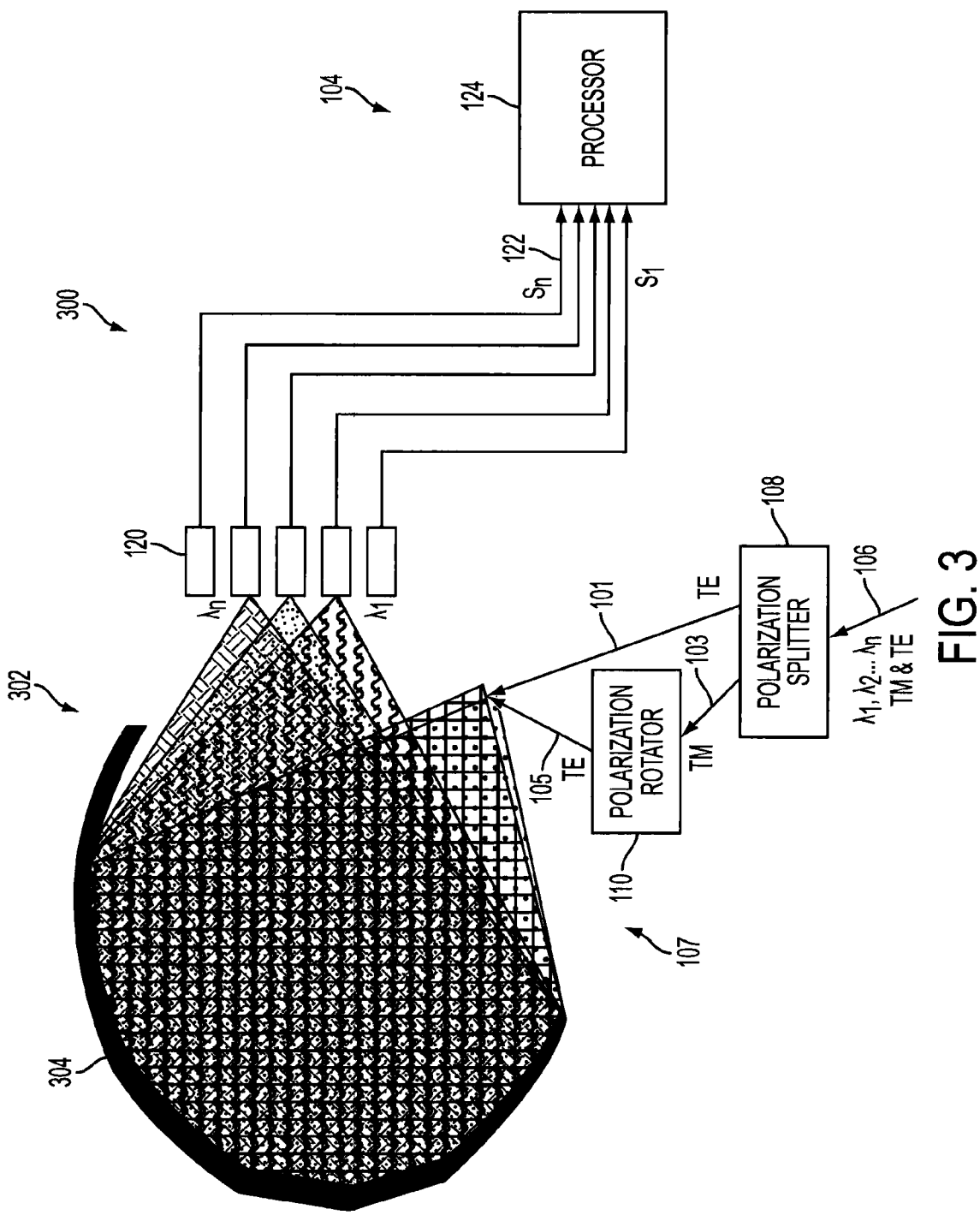
FIG. 3 illustrates another alternate exemplary embodiment of a DEMUX system.

FIG. 3 illustrates another alternate exemplary embodiment of a DEMUX system 300. In this regard, the system 300 includes an echelette grating DEMUX portion 302 that includes an echelette grating 304 that acts as a frequency dependent reflective lens. The echelette grating DEMUX portion 302 is communicatively connected to the multi-mode optical fiber 106 via the polarization splitter portion 108 and the polarization rotator portion 110 in a similar manner as discussed above. The echelette grating DEMUX portion 302 is operative to focus the received optical signal on particular photodetector devices 120 that operate in a similar manner as discussed above.

Figure 4:
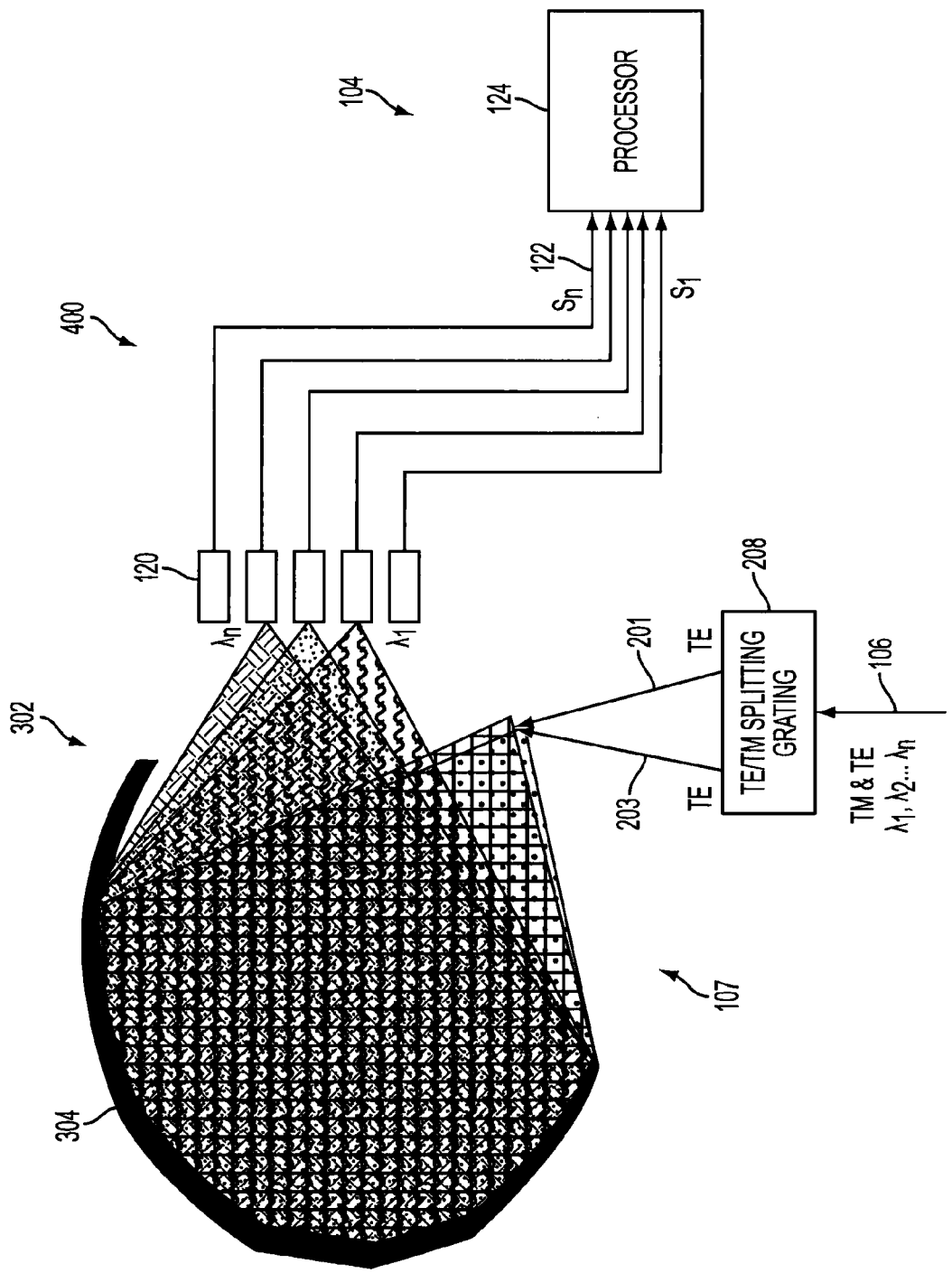
FIG. 4 illustrates yet another alternate exemplary embodiment of a DEMUX system.

FIG. 4 illustrates another alternate exemplary embodiment of a DEMUX system 400. In this regard, the system 400 includes an echelette grating DEMUX portion 302 as described above that is communicatively connected to the optical fiber 106 via the polarization splitting grating portion 208 that splits or separates the TE and TM polarizations into separate signals such that both the TE and TM polarizations propagate as TE in the waveguide circuit in a similar manner as described above.

Figure 5:
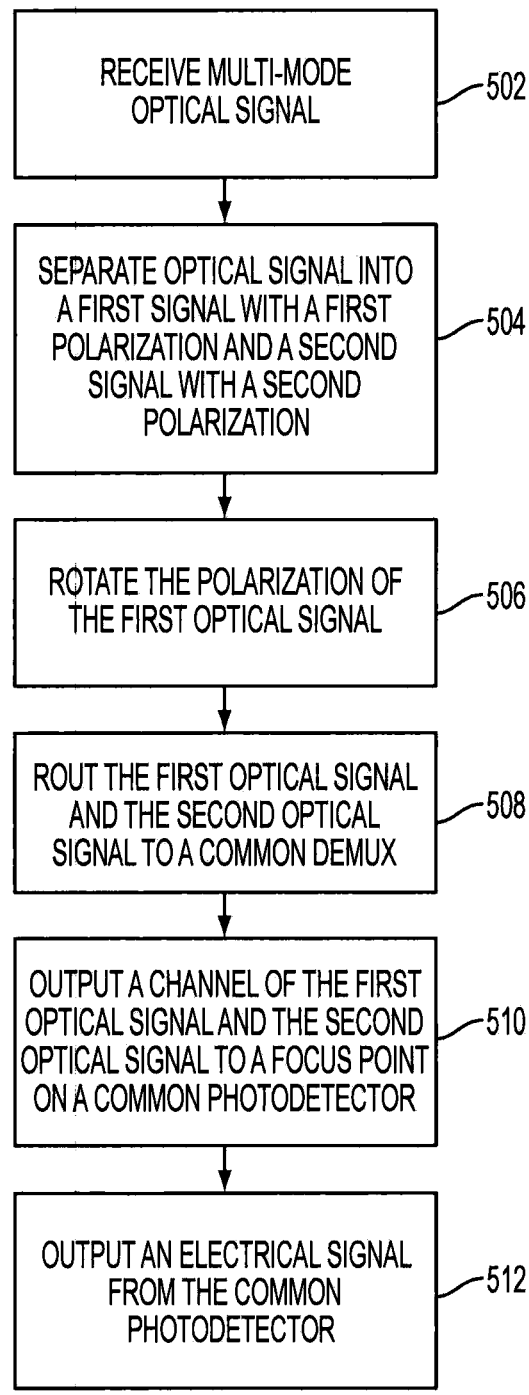
FIG. 5 illustrates a block diagram of an exemplary method for demultiplexing a multi-mode optical signal.

FIG. 5 illustrates a block diagram of an exemplary method for demultiplexing an optical signal. In block 502, an optical signal is received. The optical signal is separated into a first optical signal with a first polarization (e.g., TM) and a second optical signal with a second polarization (e.g., TE) in block 504. In block 506, the polarization of the first optical signal is rotated (e.g., TM to TE) to substantially match the polarization of the second optical signal. In block 508, the first optical signal and the second optical signal are routed to a common or single DEMUX device. In block 510, the DEMUX device demultiplexes the channels of the first optical signal and the second optical signal and focuses at least one of the channels onto a common photodetector as a first order mode output. The photodetector is a multi-mode photodetector that outputs an electrical signal corresponding to the focused channel in block 512.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for demultiplexing an optical signal, the method comprising:
    receiving a multi polarization optical signal;
    separating the multi polarization optical signal into a first polarization optical signal and a second polarization optical signal;
    rotating a polarization of the first polarization optical signal to match a polarization of the second polarization optical signal;
    focusing the rotated first polarization optical signal and the second polarization optical signal to a focal point located upstream from a common demultiplexing device to generate a multi-mode optical field and routing the rotated first polarization optical signal and the second polarization optical signal to the common demultiplexing device;
    outputting a channel including the rotated first polarization optical signal and the second polarization optical signal each having the matching polarization to a common photodetector.

2. The method of claim 1, wherein the first polarization optical signal and the second polarization optical signal are separated with a polarization splitter.

3. The method of claim 2, wherein the polarization splitter includes a Mach-Zehnder interferometer (MZI).

4. The method of claim 1, wherein the first polarization optical signal is rotated with a polarization rotator.

5. The method of claim 1, wherein the demultiplexing device includes an arrayed waveguide grating (AWG).

6. The method of claim 1, wherein the optical demultiplexing portion includes an echelette grating.

7. The method of claim 1, further comprising outputting an electrical signal from the photodetector.

8. The method of claim 6, further comprising receiving the electrical signal at a processor.

9. A method for demultiplexing an optical signal, the method comprising:
    receiving a multi polarization optical signal;
    separating the multi polarization optical signal into a first polarization optical signal and a second polarization optical signal with a polarization splitter;
    rotating a polarization of the first polarization optical signal to match a polarization of the second polarization optical signal with a polarization rotator;
    focusing the rotated first polarization optical signal and the second polarization optical signal to a focal point located upstream from a common demultiplexing device to generate a multi-mode optical field and routing the rotated first polarization optical signal and the second polarization optical signal to the common demultiplexing device;
    outputting a channel including the rotated first polarization optical signal and the second polarization optical signal each having the matching polarization to a common photodetector.

10. The method of claim 9, wherein the demultiplexing device includes an arrayed waveguide grating (AWG).

11. The method of claim 9, wherein the optical demultiplexing portion includes an echelette grating.

12. The method of claim 9, further comprising outputting an electrical signal from the photodetector.

13. The method of claim 12, further comprising receiving the electrical signal at a processor.

14. The method of claim 9, wherein the polarization splitter includes a Mach-Zehnder interferometer (MZI).

15. A method for demultiplexing an optical signal, the method comprising:
receiving a multi polarization optical signal;
separating the multi polarization optical signal into a first polarization optical signal and a second polarization optical signal and rotating a polarization of the first polarization optical signal to match a polarization of the second polarization optical signal with a polarization splitting grating;
focusing the rotated first polarization optical signal and the second polarization optical signal to a focal point located upstream from a common demultiplexing device to generate a multi-mode optical field and routing the rotated first polarization optical signal and the second polarization optical signal to the common demultiplexing device;
outputting a channel including the rotated first polarization optical signal and the second polarization optical signal each having the matching polarization to a common photodetector.

16. The method of claim 15, wherein the demultiplexing device includes an arrayed waveguide grating (AWG).

17. The method of claim 15, wherein the optical demultiplexing portion includes an echelette grating.

18. The method of claim 15, further comprising outputting an electrical signal from the photodetector.

19. The method of claim 18, further comprising receiving the electrical signal at a processor.

20. The method of claim 15, wherein the polarization splitting grating includes a Mach-Zehnder interferometer (MZI).

* * * * *